US006444328B1

(12) United States Patent
Nishiuchi et al.

(10) Patent No.: US 6,444,328 B1
(45) Date of Patent: Sep. 3, 2002

(54) FE-B-R BASED PERMANENT MAGNET HAVING CORROSION-RESISTANT FILM, AND PROCESS FOR PRODUCING THE SAME

(75) Inventors: Takeshi Nishiuchi; Fumiaki Kikui, both of Osaka; Kohshi Yoshimura, Hyogo, all of (JP)

(73) Assignee: Sumitomo Special Metals Co., Ltd., Osaka (JP)

( * ) Notice: Subject to any disclaimer, the term of this patent is extended or adjusted under 35 U.S.C. 154(b) by 0 days.

(21) Appl. No.: 09/382,588

(22) Filed: Aug. 25, 1999

(51) Int. Cl.[7] .......................... B32B 15/04; B32B 15/20
(52) U.S. Cl. ........................ 428/469; 428/450; 428/702
(58) Field of Search ................................ 428/450, 469, 428/701, 702, 688, 632; 148/302

(56) References Cited

U.S. PATENT DOCUMENTS 5,089,066 A 2/1992 Hamada et al.

FOREIGN PATENT DOCUMENTS

| | | | |
|---|---|---|---|
| JP | 4-288804 | | 10/1992 |
| JP | 06-176911 | | 6/1994 |
| JP | 06-318512 | | 11/1994 |
| JP | 7-130520 | | 5/1995 |
| JP | 7-230906 | | 8/1995 |
| JP | 10074607 | * | 3/1998 |

OTHER PUBLICATIONS

Patent Abstracts of Japan, Abstract for JP 59278489, Publication No. 61150201, Jul. 8, 1986.
Patent Abstracts of Japan, Abstract for JP 04353007, Publication No. 06176911, Jun. 24, 1999.
Patent Abstracts of Japan, Abstract for JP 08249208, Publication No. 10074607, Mar. 17, 1998.
Patent Abstracts of Japan, Abstract for JP 60289314, Publication No. 62149108, Jul. 3, 1987.

* cited by examiner

*Primary Examiner*—Deborah Jones
*Assistant Examiner*—Andrew T Piziali
(74) *Attorney, Agent, or Firm*—Armstrong, Westerman & Hattori, LLP

(57) ABSTRACT

An Fe—B—R based permanent magnet has a metal oxide film having a thickness of 0.01 $\mu$m to 1 $\mu$m on its surface with a metal film interposed therebetween. Thus, the film is excellent in adhesion to the surface of the magnet. Even if the permanent magnet is left to stand under. high-temperature and high-humidity of a temperature of 80° C. and a relative humidity of 90% for a long period of time, the magnetic characteristic of the magnet cannot be degraded. The magnet has a thermal shock resistance enough to resist even a heat cycle for a long period of time in a temperature range of −40° C. to 85° C., and can exhibit a stable high magnetic characteristic. Therefore, it is possible to produce an Fe—B—R based permanent magnet having a corrosion-resistant film free from hexa-valent chromium.

4 Claims, No Drawings

FE-B-R BASED PERMANENT MAGNET HAVING CORROSION-RESISTANT FILM, AND PROCESS FOR PRODUCING THE SAME

BACKGROUND OF THE INVENTION

FIELD OF THE INVENTION

The present invention relates to an Fe—B—R based permanent magnet having an excellent corrosion-resistant film, and a process for producing the same. More particularly, the present invention relates to an Fe—B—R based permanent magnet which has, on its surface, an excellent corrosion-resistant film having an excellent adhesion to the surface of the magnet; which has a thermal shock resistance enough to resist even a heat cycle for a long period of time in a temperature range of −40° C. to 85° C.; which can exhibit a stable high magnetic characteristic that cannot deteriorate even if the magnet is left to stand under high-temperature and high-humidity conditions of a temperature of 80° C. and a relative humidity of 90%; and in which the film is free from hexa-valent chromium, and to a process for producing the same.

DESCRIPTION OF THE RELATED ART

An Fe—B—R based permanent magnet, of which an Fe—B—Nd based permanent magnet is representative, is practically used in various applications, because it is produced of an inexpensive material rich in natural resources and has a high magnetic characteristic.

However, the Fe—B—R based permanent magnet is liable to be corroded by oxidation in the atmosphere, because it contains highly reactive R and Fe. When the Fe—B—R based permanent magnet is used without being subjected to any treatment, the corrosion of the magnet is advanced from its surface due to the presence of a small amount of acid, alkali and/or water to produce rust, thereby bringing about the degradation and dispersion of the magnetic characteristic. Further, when the magnet having the rust produced therein is assembled into a device such as a magnetic circuit, there is a possibility that the rust is scattered to pollute surrounding parts or components.

There is a already proposed magnet which has a corrosion-resistant metal-plated film on its surface, which is formed by a wet plating process such as an electroless plating process and an electroplating process in order to improve the corrosion resistance of the Fe—B—R based permanent magnet with the above-described point in view (see Japanese Patent Publication No.3-74012). In this process, however, an acidic or alkaline solution used in a pretreatment prior to the plating treatment may remain in pores in the magnet, whereby the magnet may be corroded with the passage of time in some cases. In addition, the magnet is poor in resistance to chemicals and for this reason, the surface of the magnet may be corroded during the plating treatment. Further, even if the metal-plated film is formed on the surface of the magnet, as described above, if the magnet is subjected to a corrosion test under conditions of a temperature of 60° C. and a relative humidity of 90%, the magnetic characteristic of the magnet may be degraded by 10% or more from an initial value after lapse of 100 hours.

There is also a conventionally proposed process in which a corrosion-resistant film such as a phosphate film or a chromate film is formed on the surface of an Fe—B—R based permanent magnet (see Japanese Patent Publication No.4-22008). The film formed in this process is excellent in adhesion to the surface of the magnet, but if it is subjected to a corrosion test under conditions of a temperature of 60° C. and a relative humidity of 90%, the magnetic characteristic of the magnet may be degraded by 10% or more from an initial value after lapse of 300 hours.

In a process conventionally proposed in order to improve the corrosion resistance of the Fe—B—R based permanent magnet, i.e., in a so-called aluminum-chromate treating process (see Japanese Patent Publication No.6-66173), a chromate treatment is carried out after formation of an aluminum film by a vapor deposition process. This process remarkably improves the corrosion resistance of the magnet. However, the chromate treatment used in this process uses hexa-valent chromium which is undesirable for the environment and for this reason, a waste-liquid treating process is complicated. It is feared that a film formed in this process influences a human body during handling of the magnet, because it contains just a small amount of hexa-valent chromium.

On the other hand, in recent years, the field of application of the Fe—B—R based permanent magnet is not limited to the electric industry and the domestic electric appliance industry, and it has been expected that the Fe—B—R based permanent magnet can be applied to fields where it is used in a hard condition. In correspondence to this fact, it is regarded as important that the Fe—B—R based permanent magnet has required characteristics including not only an excellent corrosion resistance under given conditions, but also an excellent thermal shock resistance relative to a variation in temperature. For example, a magnet assembled into parts such as a motor for an automobile must resist a large variation in temperature. To meet such demand, a corrosion-resistant film itself formed on the magnet must be prevented from being cracked or peeled off due to a variation in temperature.

SUMMARY OF THE INVENTION

Accordingly, it is an object of the present invention to provide an Fe—B—R based permanent magnet which has, on its surface, an excellent corrosion-resistant film having an excellent adhesion to the surface of the magnet; which has a thermal shock resistance enough to resist even a heat cycle for a long period of time in a temperature range of −40° C. to 85° C.; which can exhibit a stable high magnetic characteristic that cannot deteriorate even if the magnet is left to stand under high-temperature and high-humidity conditions of a temperature of 80° C. and a relative humidity of 90%; and in which the film is free from hexa-valent chromium, and to a process for producing the same.

The present inventors, in a course of various zealous studies made with the above points in view, have paid their intention to the fact that a metal film is formed on the surface of an Fe—B—R based permanent magnet, and a metal oxide film having less influencing the human body and the environment is formed on the metal film. A process for forming a primary coat layer on the surface of an Fe—B—R based permanent magnet using a metal as a main component, and forming a glass layer on the surface of the primary coat layer has been already proposed (see Japanese Patent Application Laid-open No.1-165105). Japanese Patent Application Laid-open No.1-165105 describes that it is difficult to form a glass layer uniformly, when the glass layer has a thickness of less than 1 $\mu$m. However, as a result of further studies made by the present inventors, surprisingly it has been found that if the metal film is formed on the surface of the Fe—B—R based permanent magnet, and the metal oxide film having a thickness of 1 μm or less is formed on the metal film, the metal oxide film is firmly closely adhered to the metal film on the magnet to exhibit an excellent effect not only in the corrosion resistance under given conditions, but also in thermal shock resistance with respect to a variation in temperature.

The present invention has been accomplished based on such knowledge. To achieve the above object, according to a first aspect and feature of the present invention, there is provided an Fe—B—R based permanent magnet having a metal oxide film having a thickness of 0.01 μm to 1 μm on the surface thereof with a metal film interposed therebetween.

According to a second aspect and feature of the present invention, in addition to the first feature, the metal film is formed of at least one metal component selected from the group consisting of Al, Sn, Zn, cu, Fe, Ni, Co and Ti.

According to a third aspect and feature of the present invention, in addition to the first feature, the metal film has a thickness in a range of 0.01 μm to 50 μm.

According to a fourth aspect and feature of the present invention, in addition to the first feature, the metal oxide film is formed of at least one metal oxide component selected from the group consisting of Al oxide, Si oxide, Zr oxide and Ti oxide.

According to a fifth aspect and feature of the present invention, in addition to the first feature, the metal oxide film is formed of a metal oxide component including the same metal component as the metal component of the metal film.

According to a sixth aspect and feature of the present invention, in addition to the first feature, the thickness of the metal oxide film is in a range of 0.05 μm to 0.5 μm.

According to a seventh aspect and feature of the present invention, in addition to the first feature, the content of carbon (C) contained in the metal oxide film is in a range of 50 ppm to 1,000 ppm.

According to an eighth aspect and feature of the present invention, in addition to the first feature, the metal oxide film is formed of a metal oxide essentially comprising an amorphous phase.

According to a ninth aspect and feature of the present invention, there is provided a process for producing an Fe—B—R based permanent magnet, comprising the steps of forming a metal film on the surface of an Fe—B—R based permanent magnet by a vapor deposition process, applying a sol solution produced by the hydrolytic reaction and the polymerizing reaction of a metal compound which is a starting material for a metal oxide film, to the surface of the metal film, and subjecting the applied sol solution to a heat treatment to form a metal oxide film having a thickness in a range of 0.01 μm to 1 μm.

According to the present invention, the Fe—B—R based permanent magnet having, on its surface, the metal oxide film having a thickness in the range of 0.01 μm to 1 μm with the metal film interposed therebetween is left to stand under high-temperature and high-humidity of a temperature of 80° C. and a relative humidity of 90% for a long period of time, the magnetic characteristic and the appearance thereof are little degraded. In addition, the Fe—B—R based permanent magnet has an excellent thermal shock resistance enough to resist a heat cycle for a long period of time in a temperature range of −40° C. to 85° C.

DETAILED DESCRIPTION OF THE INVENTION

At least one metal selected from the group consisting of, for example, Al, Sn, Zn, Cu, Fe, Ni, Co and Ti is used as a metal component for the metal film formed on the Fe—B—R based permanent magnet.

The method for forming a metal film on the surface of a magnet is particularly not limited, but a vapor deposition process is desirable in view of the fact that the magnet and the metal film are liable to be oxidized and corroded.

The vapor deposition process, which may be used, include known methods such as a vacuum evaporation process, an ion sputtering process, an ion plating process and the like. The formation of the metal film may be carried out under common conditions in each of the methods, but from the viewpoints of the denseness of the metal film, the uniformity of the thickness, the deposition rate and the like, it is desirable to employ a vacuum evaporation process or an ion plating process. Of course, the surface of the magnet may be subjected to a known cleaning treatment such as a washing, a degreasing and a sputtering process prior to the formation of the film.

It is desirable that the temperature of the magnet during the formation of the metal film is set in a range of 200° C. to 500° C. If the temperature is lower than 200° C., there is a possibility that a film having an excellent adhesion to the surface of the magnet is not formed. If the temperature exceeds 500° C., there is a possibility that cracks are generated in the film in a cooling phase after formation of the film, whereby the film is peeled off from the magnet.

The thickness of the metal film formed by the above-described process is desirable to be in a range of 0.01 μm to 50 μm, more preferably, in a range of 0.05 μm to 25 μm. This is because if the thickness is smaller than 0.01 μm, there is a possibility that an excellent corrosion resistance cannot be exhibited, and if the thickness exceeds 50 μm, there is a possibility that an increase in manufacture cost is brought about, but also there is a possibility that the effective volume of the magnet is decreased.

The adhesion between the surface of the magnet and the metal film can be enhanced by subjecting the metal film formed on the surface of the magnet by the above-described process to a heat treatment. The heat treatment may be carried out at this time, but a similar effect can be obtained even by a heat treatment for forming a metal oxide film which will be described hereinafter. It is desirable that the temperature for the heat treatment is equal to or lower than 500° C., because if the temperature exceeds 500° C., there is a possibility that the degradation of the magnetic characteristic of the magnet is brought about, and there is a possibility that the metal film is molten.

The method for forming a metal oxide film is particularly not limited, but a sol-gel process is desirable in respect of the fact that a metal oxide film can be formed simply and safely, which process comprises the steps of applying a sol solution produced by the hydrolytic reaction and the polymerizing reaction of a metal compound which is a starting material for the metal oxide film, and subjecting the applied sol solution to a heat treatment to form a metal oxide film.

The metal oxide film may be a film formed of a single metal oxide component, or a composite film formed of a plurality of metal oxide components. The metal oxide component may be, for example, at least one selected from the group consisting of aluminum (Al) oxide, silicon (Si) oxide, zirconium (Zn) oxide and titanium (Ti) oxide.

Among the films formed of the single metal oxide, the silicon oxide film ($SiO_x$ film: $0<x\leqq 2$) can be formed at a low temperature, as compared with a case where a film of another metal oxide component, because the sol solution for forming the film is stable, as compared with a sol solution for forming another metal oxide film and hence, this silicon oxide film is advantageous in that the influence to the magnetic characteristic of the magnet can be reduced. The zirconium oxide film ($ZrO_x$ film: $0<x\leqq2$) is advantageous in that it is excellent not only in corrosion resistance but also in alkali resistance.

If the metal oxide film is one containing the same metal component as the metal component of a metal film which is a primary coat layer (e.g., when an aluminum oxide film ($Al_2O_x$ film: $0<x\leqq3$) is formed on an aluminum film), this film is advantageous in that the adhesion at the interface between the metal film and the metal oxide film is firmer.

Examples of the composite film formed of a plurality of metal oxide components are a Si—Al compo sit e film ($SiO_xAl_2O_y$ film: $0<x\leqq2$ and $0<y\leqq3$), a Si—Zr composite film ($SiO_x.ZrO_y$ film: $0<x\leqq2$ and $0<y\leqq2$) and a Si—Ti composite film ($SiO_x.TiO_y$ film: $0<x\leqq2$ and $0<y\leqq2$) The composite film containing a Si oxide component is advantageous in that the sol solution is relatively stable, and that such film can be formed at a relatively low temperature and hence, the influence to the magnetic characteristic of the magnet can be reduced. The composite film containing a Zr oxide component is advantageous in that it is excellent in alkali resistance.

If the metal oxide film is a composite film containing the same metal component as the metal component of the metal film as the primary coat layer (e.g., when a Si—Al composite oxide film is formed on an aluminum film, or when a Si—Ti composite oxide film is formed on a titanium film), this composite film is advantageous in respect of that the adhesion at the interface between the metal film and the composite film is firmer.

The sol solution used in the sol-gel process is a solution made by preparing a metal compound which is a source for forming a metal oxide film, a catalyst, a stabilizer and water in an organic solvent to produce a colloid by the hydrolytic reaction and the polymerizing reaction, so that the colloid is dispersed in the solution.

Examples of the metal compound as the source for forming the metal oxide film, which may be used, are a metal alkoxide (which may be an alkoxide with at least one alkoxyl group substituted with an alkyl group such as methyl group and ethyl group or with a phenyl group or the like) such as methoxide, ethoxide, propoxide, butoxide; a metal carboxylate such as oxalate, acetate, octylate and stearate; a chelate compound such as metal acetylacetonate; and inorganic salts such as metal nitrate and chloride.

If the stability and cost of the sol solution is taken into consideration, in cases of an aluminum compound used for forming an aluminum oxide film and a zirconium compound used for forming a zirconium oxide film, it is desirable to use an alkoxide having an alkoxyl group containing 3 to 4 carbon atoms such as aluminum and zirconium propoxides and butoxides, a carboxylate such as metal acetate and octylate. In a case of a silicon (Si) compound used for forming a Si oxide film, it is desirable to use an alkoxide having an alkoxyl group containing 1 to 3 carbon atoms such as silicon methoxide, ethoxide and propoxide. In a case of a titanium (Ti) compound used for forming a Ti oxide film, it is desirable to use an alkoxide having an alkoxyl group containing 2 to 4 carbon atoms such as titanium ethoxide, propoxide and butoxide.

To form a composite oxide film, a plurality of metal compounds may be used in the form, of a mixture thereof, and a metal composite compound such as a metal composite alkoxide may be used alone or in combination with a metal compound. For example, to form a Si—Al composite oxide film, a Si—Al composite compound such as a Si—Al composite alkoxide having a Si—O—Al bond and alkoxyl groups (some of which may be substituted with an alkyl group such as methyl group and ethyl group or with a phenyl group or the like) containing 1 to 4 carbon atoms may be used. Particular examples of Such compound are $(H_3CO)_3$—Si—O—Al—$(OCH_3)_2$ and $(H_5C_2O)_3$—Si—O—Al—$(OC_2H_5)_2$.

When a composite oxide film is to be formed using a plurality of metal compounds, the mixing proportion of each metal compound is particularly not limited, and may be determined in accordance with the proportions of components for a desired composite oxide film.

For example, when a Si—Al composite oxide film is to be formed on an aluminum (Al) film, it is desirable that a Si compound and an Al compound are mixed for use, or a Si compound and a Si—Al composite compound are mixed for use, so that the molar ratio (Al/Si+Al) of aluminum to the total number of moles of silicon (Si) and aluminum (Al) contained in the Si—Al composite oxide film is equal to or larger than 0.001. By mixing such compounds at the above-described molar ratio, the reactivity at the interface with the aluminum film can be enhanced, while maintaining excellent characteristics (the sol solution is stable and the film can be formed at a relative low temperature) in the silicon oxide film. When a heat treatment (which will be described hereinafter) is carried out at 150° C. or lower after application of the sol solution to the surface of the metal film, the molar ratio is desirable to be 0.5 or less. When such a treatment is carried out at 100° C. or lower, the molar ratio is desirable to be 0.2 or less. This is because it is necessary to increase the temperature in the heat treatment, as the proportion of aluminum mixed is increased.

The proportion of metal compound blended to the sol solution is desirable to be in a range of 0.1% by weight to 20% by weight (in terms of the proportion of the metal oxide, e.g., in terms of the proportion of $SiO_2$ in a case of a Si compound, and in terms of the proportion of $SiO_2+Al_2O_3$ in a case of a Si compound+an Al compound). If the proportion is lower than 0.1% by weight, there is a possibility that an excessive cycle of the film forming step is required in order to form a film having a satisfactory thickness. If the proportion exceeds 20% by weight, there is a possibility that the viscosity of the sol solution is increased, thereby making it difficult to form the film.

Acids such as acetic acid, nitric acid and hydrochloric acid may be used alone or in a combination as a catalyst. The appropriate amount of acid(s) added is defined by the hydrogen ion concentration in the prepared sol solution, and it is desirable that the acid(s) is added, so that the pH value of the sol solution is in a range of 2 to 5. If the pH value is smaller than 2, or exceeds 5, there is a possibility that the hydrolytic reaction and the polymerizing reaction cannot be controlled at the time of preparing a sol solution suitable for forming a film.

If required, the stabilizer used to stabilize the sol solution may be selected properly depending on the chemical stability of a metal compound used, but a compound capable of forming a chelate with a metal is preferable such as a β-diketone such as acetylacetone, and a β-keto ester such as ethyl acetoacetate.

The amount of stabilizer mixed is desirable to be equal to or smaller than 2 in terms of a molar ratio (stabilizer/metal compound) when the β-diketone is used. If the molar ratio exceeds 2, there is a possibility that the hydrolytic reaction and the polymerizing reaction to prepare the sol solution may be hindered.

Water may be supplied to the sol solution directly or indirectly by a chemical reaction, e.g., by utilizing water produced by an esterifying reaction with a carboxylic acid, when an alcohol is used as a solvent, or by utilizing water vapor in the atmosphere. When water is supplied directly or indirectly to the sol solution, the molar ratio of water/metal compound is desirable to be equal to or smaller than 100. If the molar ratio exceeds 100, there is a possibility that the stability of the sol solution is influenced.

The organic solvent is not limited, and may be any solvent which is capable of homogeneously dissolving all of a metal compound, a catalyst, a stabilizer and water which are components of the sol solution, so that the produced colloid is dispersed homogeneously in the solution. Examples of the organic solvent which may be used are a lower alcohol such as ethanol; a hydrocarbonic ether alcohol such as ethylene glycol mono-alkyl ether; an acetate of hydrocarbonic ether alcohol such as ethylene glycol mono-alkyl ether acetate; an acetate of lower alcohol such as ethyl acetate; and a ketone such as acetone. From the viewpoints of the safety during treatment and the cost, it is desirable that lower alcohols such as ethanol, isopropyl alcohol and butanol are used alone or in combination.

The viscosity of the sol solution depends on the combination of various components contained in the sol solution, and is desirable to be generally equal to or smaller than 20 cP. If the viscosity exceeds 20 cP, there is a possibility that it is difficult to form a film uniformly, and cracks may be generated during a thermal treatment.

The time and temperature for preparing the sol solution depend on the combination of various components contained in the sol solution. Usually, the preparing time is in a range of 1 minute to 72 hours, and the preparing temperature is in a range of 0° C. to 100° C.

Examples of the method for applying the sol solution to the surface of the metal film, which may be used, are a dip coating process, a spraying process and a spin coating process.

After application of the sol solution to the surface of the metal film, the applied sol solution is subjected to a heat treatment. The heating temperature required may be a level enough to evaporate at least the organic solvent. For example, when the ethanol is used as the organic solvent, the minimum temperature is 80° C. which is a boiling point of the ethanol. On the other hand, when a sintered magnet is used, if the heating temperature exceeds 500° C., there is a possibility that the degradation of the magnetic characteristic of the magnet is caused, or the metal film is molten. Therefore, the heating temperature is desirable to be in a range of 80° C. to 500° C., and more preferably, is in a range of 80° C., to 250° C. from the viewpoint for preventing the generation of cracks during cooling after the heat treatment to the utmost. When a bonded magnet is used, the temperature condition for the heat treatment must be set in consideration of the heat-resistant temperature of a resin used. For example, when a bonded magnet made using an epoxy resin or a polyamide resin is used, the heating temperature is desirable to be in a range of 80° C. to 200° C. in consideration of the heat-resistant temperatures of these resins. Usually, the heating time is in a range of 1 minute to 1 hour.

According to the above-described process, a metal oxide film essentially comprising an amorphous phase, which is excellent in corrosion resistance, can be formed. For example, with a Si—Al composite oxide film, the structure thereof includes a large number of Si—O—Si bonds and a large number of Si—O—Al bonds, when in a case of a Si-rich film, and includes a large number of Al—O—Al bonds and a large number of Si—O—Al bonds in a case of an Al-rich film. The proportions of both the components in the film are determined by a proportion of metal compound mixed.

According to the above-described process, the metal oxide film contains carbon (C) due to the metal compound and the stabilizer. The metal oxide film essentially comprising an amorphous phase, which is excellent in corrosion resistance, is produced easily by the containment of carbon, and it is desirable that the carbon (C) content is in a range of 50 ppm to 1,000 ppm (wt/wt). If the C content is smaller than 50 ppm, there is a possibility that cracks are generated in the film. If the C content exceeds 1,000 ppm, there is a possibility that the densification of the film does not occur sufficiently.

The metal oxide film formed by the above-described process has a thickness set in a range of 0.01 μm to 1 μm, because if the thickness is smaller than 0.01 μm, there is a possibility that an excellent corrosion resistance cannot be exhibited under given conditions, and if the thickness exceeds 1 μm, there is a possibility that cracks are generated in the film or the peeling-off of the film occurs due to a variation in temperature, and thus, an excellent thermal shock resistance cannot be exhibited. To exhibit an excellent corrosion resistance under given conditions and an excellent thermal shock resistance to a variation in temperature, it is desirable that the thickness of the metal oxide film is in a range of 0.05 μm to 0.5 μm. Of course, if required, the application of the sol solution to the surface of the metal film and the subsequent heat treatment may be conducted repeatedly a plurality of times.

A shot peening (a process for modifying the surface by bumping hard particles against the surface) may be carried out as a previous step before the formation of the metal oxide film on the metal film. The metal film can be smoothened by carrying out the shot peening, thereby facilitating the formation of a metal oxide film which is thin, but has an excellent corrosion resistance.

It is desirable that a powder having a hardness equivalent to or more than the hardness of the formed metal film is used for the shot peening. Examples of such powder are spherical hard particles having a Mohs hardness of 3 or more such as steel balls and glass beads. If the average particle size of the powder is smaller than 30 μm, the pushing force applied to the metal film is smaller and hence, a lot of time is required for the treatment. On the other hand, if the average particle size of the powder exceeds 3,000 μm, there is a possibility that the smoothness of the surface is too large, and the finished surface is uneven. Therefore, the average particle size of the powder is desirably in a range of 30 μm to 3,000 μm, and more desirably in a range of 40 μm to 2,000 μm.

The blast pressure in the shot peening is desirable to be in a range of 1.0 $kg/cm^2$ to 5.0 $kg/cm^2$. If the blast pressure is lower than 1.0 $kg/cm^2$, there is a possibility that the pushing force applied to the metal film is smaller and a lot of time is required for the treatment. If the blast pressure exceeds 5.0 $kg/cm^2$, there is a possibility that the pushing force applied to the metal film is ununiform, thereby bringing about the degradation of the smoothness of the surface.

The blast time in the shot peening is desirable to be in a range of 1 minute to 1 hour. If the blast time is shorter than 1 minute, there is a possibility that the uniform treatment of the entire surface cannot be achieved. If the blast time exceeds 1 hour, there is a possibility that the degradation of the smoothness of the surface is brought about.

A rare earth element (R) contained in an Fe—B—R based permanent magnet used in the present invention is desirably at least one element from among Nd, Pr, Dy, Ho, Tb and Sm, in addition thereto at least one element from among La, Ce, Gd, Er, Eu, Tm, Yb, Lu and Y.

Usually, one of them (R) suffices, but in practice, a mixture of two or more rare earth elements (misch metal and didymium and the like) maybe used for the reason of a procurement convenience.

The content of R in an Fe—B—R based permanent magnet is desirable to be in a range of 10% by atom to 30% by atom. If the R content is lower than 10% by atom, the crystal structure is the same cubic crystal structure as α-Fe and for this reason, a high magnetic characteristic, particularly, a high coercive force (iHc) is not obtained. On the other hand, if the R content exceeds 30% by atom, the content of an R-rich non-magnetic phase is increased, and the residual magnetic flux density (Br) is reduced, whereby a permanent magnet having an excellent characteristic is not produced.

The Fe content is desirable to be in a range of 65% by atom to 80% by atom. If the Fe content is lower than 65% by atom, the residual magnetic flux density (Br) is reduced. If the Fe content is exceeds 80% by atom, a high coercive force (iHc) is not obtained.

It is possible to improve the temperature characteristic without degradation of the magnetic characteristic of the produced magnet by substituting a portion of Fe with Co. However, if the amount of Co substituted exceeds 20% of Fe, the magnetic characteristic is degraded and hence, such amount is not preferred. The amount of Co substituted in a range of 5% by atom to 15% by atom is desirable for providing a high magnetic flux density, because the residual magnetic flux density (Br) is increased, as compared with a case where a portion of Fe is not substituted.

The B content is desirable to be in a range of 2% by atom to 28% by atom. If the B content is smaller than 2% by atom, a rhombohedral structure is a main phase, and a high coercive force (iHc) is not obtained. If the B content exceeds 28% by atom, the content of a B-rich non-magnetic phase is increased, and residual magnetic flux density (Br) is reduced, whereby a permanent magnet having an excellent characteristic is not produced.

To improve the manufacture of the magnet and reduce the cost, at least one of 2.0% by weight of P and 2.0% by weight of S may be contained in a total amount of 2.0% by weight or less in the magnet. Further, the corrosion resistance of the magnet can be improved by substituting a portion of B with 30% by weight or less of carbon (C).

Further, the addition of at least one of Al, Ti, V, Cr, Mn, Bi, Nb, Ta, Mo, W, Sb, Ge, Sn, Zr, Ni, Si, Zn, Hf and Ga is effective for improving the coercive force and the rectangularity of a demagnetizing curve and for improving the manufacture and reducing the cost. It is desirable that at least one of them is added in an amount within a range satisfying a condition that at least 9 kG of Br is required in order to ensure that the maximum energy product (BH)max is equal to or larger than 20 MGOe.

In addition to R, Fe and B, the Fe—B—R based permanent magnet may contain impurities inevitable for industrial production of the magnet.

The Fe—B—R based permanent magnet used in the present invention has a feature in that: it includes a main phase comprising a compound having a tetragonal crystal structure with an average crystal grain size in a range of 1 μm to 80 μm, and 1% to 50% by volume of a non-magnetic phase (excluding an oxide phase). The magnet shows iHc≧1 kOe, Br>4 kG and (BH) max≧10 MGOe, wherein the maximum value of (BH) max reaches 25 MGOe or more.

A further film may be formed on the metal oxide film of the present invention. By employing such a configuration, it is possible to enhance the characteristic of the metal oxide film and provide a further functionability to the metal oxide film.

EXAMPLES

For example, as described in U.S. Pat. No. 4,770,723, a known cast Ingot was pulverized and then subjected sequentially to a pressing, a sintering, a heat treatment and a surface working, thereby producing a sintered magnet having a size of 23 mm×10 mm×6 mm and a composition of 17Nd—1Pr—75Fe—7B (which will be referred to as "magnet test piece" hereinafter). The magnet test piece was subjected to the following experiment, wherein the thickness of a metal film was measured using a fluorescence X ray thickness-meter, and the thickness of a metal oxide film was measured by observing a broken face of the film by an electron microscope. The content of carbon (C) in the metal oxide film was measured, by a glow discharge mass spectrometer. In addition, the structure of the metal oxide film was analyzed using an X ray diffract meter.

It should be noted that the present invention is not limited to an Fe—B—R based sintered magnet and is also applicable to an Fe—B—R based bonded magnet.

Example 1

A vacuum vessel was evacuated to lower than $1\times10^{-4}$ Pa, and a magnet test piece was subjected to a sputtering in it for 35 minutes under conditions of an argon gas pressure of 10 Pa and a bias voltage of −400 V, and the surface of the magnet was cleaned.

Then, the magnet test piece was subjected to an arc ion plating process for 10 minutes with aluminum metal used as a target under conditions of an argon gas pressure of 0.2 Pa, a bias voltage of −50 V and a magnet temperature of 250° C., whereby an aluminum film was formed on the surface of the magnet and left to cool. The formed aluminum film had a thickness of 0.5 μm.

A sol solution was prepared from components: an aluminum compound, a catalyst, a stabilizer, an organic solvent and water which are shown in Table 1, at a composition, a viscosity and a pH value which are shown in Table 2. The sol solution was applied to the magnet having the aluminum film at a pulling rate shown in Table 3 by a dip coating process, and then subjected to a heat treatment shown in Table 3 to form an aluminum oxide film on the aluminum film. The formed film ($Al_2O_x$ film: $0<x\leqq3$) had a thickness of 0.3 μm. The content of carbon (C) in the film was 350 ppm. The structure of the film was amorphous.

The magnet produced by the above-described process and having the aluminum oxide film on its surface with the aluminum film interposed therebetween was subjected to a corrosion resistance acceleration test by leaving it to stand under high-temperature/high-humidity conditions of a temperature of 80° C. and a relative humidity of 90% for 300 hours. The magnetic characteristics before and after the test and the variation in appearance after the test are shown in Table 4. As a result, it was found that even if the magnet was left to stand under the high-temperature/high-humidity conditions for the long period of time, the magnetic characteristic and the appearance of the magnet were little degraded, and a required corrosion resistance was satisfied sufficiently.

Example 2

The magnet test piece was cleaned under the same conditions as in Example 1. Then, an aluminum (Al) wire used as a coating material was heated, evaporated, ionized and the magnet test piece was subjected to an ion plating process for one minute under conditions of an argon gas pressure 1 Pa and a voltage of 1.5 kV to form an aluminum film on the surface of the magnet, and the film was left to cool. The formed aluminum film had a thickness of 0.9 μm.

A sol solution was prepared from components: an Al compound, a catalyst, a stabilizer, an organic solvent and water shown in Table 1, at a composition, a viscosity and a pH value shown in Table 2. The sol solution was applied to the magnet having the aluminum film at a pulling rate shown in Table 3 by a dip coating process and then subjected to a heat treatment shown in Table 3 to form an aluminum oxide film on the aluminum film. The formed film ($Al_2O_x$ film: $0<x\leqq 3$) had a thickness of 0.1 μm. The amount of carbon in the film was 120 ppm. The structure of the film was essentially amorphous, but a crystalline phase was also present therein.

The magnet produced by the above-described process and having the Al oxide film on its surface with the aluminum film interposed therebetween was subjected to a corrosion resistance acceleration test under the same conditions as in Example 1. Results are given in Table 4. As a result, it was found that the produced magnet satisfies a required corrosion resistance sufficiently. The magnet was bonded to a jig made of a cast iron with a modified acrylate-based adhesive (Product No hard loc G-55 made by Denki Kagaku Kogyo Kabushiki Kaisha) and left to stand for 24 hours and then subjected to another test, i.e., a compressing-shearing test using an Amsler testing machine to measure a shear bond strength of the magnet, thereby providing an excellent value of 341 kgf/cm$^2$.

Example 3

Under the same conditions as in Example 1, the magnet test piece was cleaned and then subjected to an arc ion plating process for 2.5 hours, whereby an aluminum film was formed on the surface of the magnet and left to cool. The formed aluminum film had a thickness of 5 μm.

A sol solution was prepared from components: an Al compound, acatalyst, a stabilizer, an organic solvent and water shown in Table 1, at a composition, a viscosity and a pH value shown in Table 2. The sol solution was applied to the magnet having the aluminum film at a pulling rate shown in Table 3 by a dip coating process and then subjected to a heat treatment shown in Table 3 to form an Al oxide film on the aluminum film. The formed film ($Al_2O_x$ film: $0<x\leqq 3$) had a thickness of 0.3 μm. The amount of carbon in the film was 350 ppm. The structure of the film was amorphous.

The magnet produced by the above-described process and having the Al oxide film on its surface with the aluminum film interposed therebetween was subjected to a corrosion resistance acceleration test by leaving it to stand for 1,000 hours under high-temperature and high-humidity conditions of a temperature of 80° C. and a relative humidity of 90%. The magnetic characteristics before and after the test and the variation in appearance after the test are shown in Table 5. As a result, it was found that even if the produced magnet left to stand for a long period of time under the high-temperature and high-humidity conditions, the magnetic characteristic and the appearance thereof are little degraded, and the magnet satisfies a required corrosion resistance sufficiently.

Example 4

An aluminum film was formed on the surface of the magnet for 7 minutes under the same conditions as in Example 2 by an ion plating process and then left to cool. The formed aluminum film had a thickness of 7 μm.

A powder of spherical glass beads having an average particle size of 120 μm and a Mohs hardness of 6 was blasted onto the surface of the aluminum film along with a pressurized gas of nitrogen ($N_2$) at a blast pressure of 1.5 kg/cm$^2$ for 5 minutes, whereby a shot peening was carried out.

A sol solution was prepared from components: an Al compound, a catalyst, a stabilizer, an organic solvent and water shown in Table 1, at a composition, a viscosity and a pH value shown in Table 2. The sol solution was applied to the magnet having the aluminum film at a pulling rate shown in Table 3 by a dip coating process and then subjected to a heat treatment shown in Table 3 to form an Al oxide film on the aluminum film. The formed film ($Al_2O_x$ film: $0<x\leqq 3$) had a thickness of 0.1 μm. The amount of carbon in the film was 120 ppm. The structure of the film was amorphous.

The magnet produced by the above-described process and having the Al oxide film on its. surface with the Al film interposed therebetween was subjected to a corrosion resistance acceleration test under the same conditions as in Example 3. Results are given in Table 5. As a result, it was found that the produced magnet satisfies a required corrosion resistance sufficiently. The magnet was also subjected to another test, i.e., a compressing-shearing test under the same conditions as in Example 2 to measure a shear bond strength of the magnet, thereby providing an excellent value of 336 kgf/cm$^2$.

Example 5

An aluminum film was formed on the surface of the magnet for 10 minutes under the same conditions as in Example 2 by an ion plating process and then left to cool. The formed aluminum film had a thickness of 10 μm.

A sol solution was prepared from components: an Al compound, a catalyst, a stabilizer, an organic solvent and water shown in Table 1, at a composition, a viscosity and a pH value shown in Table 2. The sol solution was applied to the magnet having the aluminum film at a pulling rate shown in Table 3 by a dip coating process and then subjected to a heat treatment shown in Table 3 to form an Al oxide film on the aluminum film. The formed film ($Al_2O_x$ film: $0<x\leqq 3$) had a thickness of 1 μm. The amount of carbon in the film was 500 ppm. The structure of the film was amorphous.

The magnet produced by the above-described process and having the Al oxide film on its surface with the Al film interposed therebetween was subjected to a corrosion resistance acceleration test under the same conditions as in Example 3. Results are given in Table 5. As a result, it was found that the produced magnet satisfies a required corrosion resistance sufficiently.

TABLE 1

| | Al compound | Catalyst | Stabilizer | Organic solvent |
|---|---|---|---|---|
| Example 1 | aluminum isopropoxide | nitric acid | acetyl-acetone | ethanol |
| Example 2 | aluminum butoxide | nitric acid + acetic acid | ethyl acetoacetate | ethanol + IPA |
| Example 3 | aluminum isopropoxide | nitric acid | acetyl-acetone | ethanol |
| Example 4 | aluminum butoxide | nitric acid + acetic acid | ethyl acetoacetate | ethanol + IPA |
| Example 5 | aluminum butoxide | hydrochloric acid | not added | 2-methoxy-ethanol |

IPA = isopropyl alcohol

TABLE 2

| | Proportion of Al compound (% by weight in terms of $Al_2O_3$) | Molar ratio Catalyst/Al compound | Molar ratio Stabilizer/ Al compound | Molar ratio Water/Al compound | Viscosity (cP) | pH |
|---|---|---|---|---|---|---|
| Example 1 | 8 | 0.001 | 1.5 | 5 | 3.6 | 3.1 |
| Example 2 | 5 | 0.01 (nitric acid) 2 (acetic acid) | 1 | 1 | 2.3 | 3.9 |
| Example 3 | 8 | 0.001 | 1.5 | 5 | 3.6 | 3.1 |
| Example 4 | 5 | 0.01 (nitric acid) 2 (acetic acid) | 1 | 1 | 2.3 | 3.9 |
| Example 5 | 1 | 0.005 | 0 | 0 (Note. 1) | 2.0 | 2.4 |

Note.1: utilizing water vapor in the atmosphere.

TABLE 3

| | Pulling rate (cm/min) | Heat treatment | Note |
|---|---|---|---|
| Example 1 | 5 | 200° C. × 20 min | |
| Example 2 | 5 | 350° C. × 20 min | |
| Example 3 | 5 | 200° C. × 20 min | |
| Example 4 | 5 | 350° C. × 20 min | |
| Example 5 | 5 | 200° C. × 10 min | Pulling-up and heat treatment were repeated five times |

TABLE 4

| | Before corrosion-resistance test | | | After corrosion-resistance test | | | |
|---|---|---|---|---|---|---|---|
| | Br (kG) | iHc (kOe) | (BH) max (MGOe) | Br (kG) | iHc (kOe) | (BH) max (MGOe) | Appearance after test |
| Example 1 | 11.3 | 16.6 | 30.4 | 11.2 | 16.4 | 29.7 | not varied |
| Example 2 | 11.3 | 16.6 | 30.5 | 11.3 | 16.5 | 29.9 | not varied |
| Com. Example 1 | 11.3 | 16.7 | 30.5 | 10.4 | 15.6 | 27.3 | locally rusted |
| Com. Example 2 | 11.4 | 16.6 | 30.6 | 10.0 | 15.2 | 26.5 | hardly rusted on entire surface |

Com. = Comparative

TABLE 5

| | Before corrosion-resistance test | | | After corrosion-resistance test | | | |
|---|---|---|---|---|---|---|---|
| | Br (kG) | iHc (kOe) | (BH) max (MGOe) | Br (kG) | iHc (kOe) | (BH) max (MGOe) | Appearance after test |
| Example 3 | 11.4 | 16.7 | 30.6 | 11.1 | 16.3 | 29.6 | not varied |
| Example 4 | 11.3 | 16.6 | 30.5 | 11.3 | 16.5 | 29.9 | not varied |
| Example 5 | 11.4 | 16.6 | 30.6 | 11.4 | 16.5 | 30.0 | not varied |
| Com. Example 3 | 11.4 | 16.7 | 30.6 | 10.3 | 15.3 | 27.5 | locally rusted |
| Com. Example 4 | 11.4 | 16.6 | 30.5 | 10.8 | 16.0 | 28.6 | Ni film was partially peeled off |

Com. = Comparative

Comparative Example 1

The magnet test piece was degreased, dipped into an acid and immersed into a treating solution comprising 4.6 g/l of zinc and 17.8 g/l of phosphate having a temperature 70° C., whereby a phosphate film having a thickness of 1 μm was formed on the surface of the magnet. The produced magnet was subjected to a corrosion resistance acceleration test under the same conditions as in Example 1. Results are given in Table 4. As a result, the produced magnet was degraded in magnetic characteristic and rusted.

Comparative Example 2

The magnet test piece was subjected to a corrosion resistance acceleration test under the same conditions as in Example 1. Results are given in Table 4. As a result, the magnet test piece was degraded in magnetic characteristic and rusted.

Comparative Example 3

The magnet having the Al film on its surface after being subjected to the shot peening in Example 4 was subjected to a corrosion resistance acceleration test under the same conditions as in Example 3. Results are give in Table 5. As a result, the produced magnet was degraded in magnetic characteristic and rusted.

Comparative Example 4

The magnet having the Al film on its surface after being subjected to the shot peening in Example 4 was cleaned and then immersed into a treating solution having a temperature of 23° C. and comprising 300 g/l of sodium hydroxide, 40 g/l of zinc oxide, 1 g/l of ferric chloride and 30 g/l of Rochelle salt, whereby the surface of the Al film was substituted with Zinc (Zn). The magnet was further subjected to an electroplating under a condition of a current density of 1.8 A/dm$^2$ using a plating solution having a temperature of 55° C. and a pH value of 4.2 and comprising 240 g/l of nickel sulfate, 48 g/l of nickel chloride, an appropriate amount of nickel carbonate (with pH value regulated) and 30 g/l of boric acid, whereby an Ni film having a thickness of 0.9 μ was formed on the Al film with its surface substituted with zinc. The resulting magnet was subjected to a corrosion resistance acceleration test under the same conditions as in Example 3. Results are shown in Table 5. As a result, the produced magnet was degraded in magnetic characteristic and the Ni film was partially peeled off.

Examples 6, 7 and 8

A sol solution having a composition, a viscosity and a pH value shown in Table 7 was prepared from components: a metal compound, a catalyst, a stabilizer, an organic solvent and water shown in Table 6. The sol solution was applied to the magnet produced in Example 1 and having the Al film having a thickness of 0.5 μm on its surface at a pulling rate shown in Table 8 by a dip coating process and then subjected to a heat treatment shown in Table 8 to form a metal oxide film on the Al film. The thickness of the formed film ($MO_x$ film: M represents Si, Zr and Ti. $0<x\leqq 2$), the amount of carbon (C) in the film and the structure of the film are shown in Table 9.

The magnet produced by the above-described process and having the metal oxide film on its surface with the Al film interposed therebetween was subjected to a corrosion resistance acceleration test under the same conditions as in Example 1. Results are shown in Table 10. As a result, it was found that the produced magnet satisfies a required corrosion resistance sufficiently.

Examples 9, 10 and 11

A sol solution having a composition, a viscosity and a pH value shown in Table 7 was prepared from components: a metal compound, a catalyst, a stabilizer, an organic solvent and water shown in Table 6. The sol solution was applied to the magnet produced in Example 2 and having the Al film having a thickness of 0.9 μm on its surface at a pulling rate shown in Table 8 by a dip coating process and then subjected to a heat treatment shown in Table 8 to form a metal oxide film on the Al film. The thickness of the formed film ($MO_x$ film: M represents Si, Zr and Ti. $0<x\leqq 2$), the amount of carbon (C) in the film and the structure of the film are shown in Table 9.

The magnet produced by the, above-described process and having the metal oxide film on its surface with the Al film interposed therebetween was subjected to a corrosion resistance acceleration test under the same conditions as in Example 1. Results are shown in Table 10. As a result, it was found that the produced magnet satisfies a required corrosion resistance sufficiently. The magnet produced in Example 9 and having the Si oxide film on its surface with the Al film interposed therebetween was subjected to another test, i.e., a compressing-shearing test under the same conditions as in Example 2 to measure a shear bond strength of the magnet, thereby providing an excellent value of 273 kgf/cm$^2$.

TABLE 6

| | Metal compound | Catalyst | Stabilizer | Organic solvent |
|---|---|---|---|---|
| Example 6 | tetramethoxy silane | nitric acid | not added | ethanol |
| Example 7 | zirconium isopropoxide | nitric acid | acetylacetone | ethanol |
| Example 8 | titanium isopropoxide | nitric acid | not added | ethanol |
| Example 9 | tetraethoxy silane | acetic acid | not added | ethanol + IPA |
| Example 10 | zirconium butoxide | acetic acid | ethyl aceto acetate | ethanol + IPA |
| Example 11 | titanium butoxide | hydro-chloric acid | acetylacetone | ethanol + IPA |

IPA: isopropyl alcohol

TABLE 7

| | Proportion of metal compound (% by weight) | Molar ratio Catalyst/ Metal compound | Stabilizer/ Metal compound | Water/ Metal compound | Viscosity (cP) | pH |
|---|---|---|---|---|---|---|
| Example 6 | 10 (Note. 1) | 0.001 | 0 | 1 | 1.8 | 3.2 |
| Example 7 | 3 (Note. 2) | 0.001 | 1 | 5 | 1.8 | 3.4 |
| Example 8 | 3 (Note. 3) | 0.002 | 0 | 1 | 2.1 | 2.1 |
| Example 9 | 5 (Note. 1) | 2 | 0 | 5 | 1.4 | 4.2 |
| Example 10 | 5 (Note. 2) | 2 | 1.5 | 1 | 1.7 | 4.0 |
| Example 11 | 5 (Note. 3) | 0.005 | 1.5 | 3 | 1.8 | 2.6 |

Note. 1: in terms of $SiO_2$
Note. 2: in terms of $ZrO_2$
Note. 3: in terms of $TiO_2$

TABLE 8

| | Pulling rate (cm/min) | Heat treatment | Note |
|---|---|---|---|
| Example 6 | 5 | 100° C. × 20 min | |
| Example 7 | 10 | 200° C. × 20 min | |
| Example 8 | 10 | 200° C. × 20 min | |
| Example 9 | 10 | 200° C. × 20 min | |
| Example 10 | 10 | 350° C. × 20 min | |
| Example 11 | 10 | 350° C. × 20 min | |

TABLE 9

| | Metal oxide film | Thickness (μm) | Amount of C in film (ppm) | Structure of film |
|---|---|---|---|---|
| Example 6 | Si oxide film | 0.3 | 350 | amorphous |
| Example 7 | Zr oxide film | 0.3 | 380 | amorphous |
| Example 8 | Ti oxide film | 0.3 | 380 | amorphous |
| Example 9 | Si oxide film | 0.07 | 90 | amorphous |
| Example 10 | Zr oxide film | 0.1 | 140 | essentially amorphous (and partially crystalline) |
| Example 11 | Ti oxide film | 0.1 | 140 | essentially amorphous (and partially crystalline) |

TABLE 10

| | Before corrosion-resistance test Br (kG) | iHc (kOe) | (BH) max (MGOe) | After corrosion-resistance test Br (kG) | iHc (kOe) | (BH) max (MGOe) | Appearance after test |
|---|---|---|---|---|---|---|---|
| Example 6 | 11.3 | 16.6 | 30.4 | 11.3 | 16.3 | 29.7 | not varied |
| Example 7 | 11.3 | 16.6 | 30.4 | 11.2 | 16.4 | 29.7 | not varied |
| Example 8 | 11.4 | 16.6 | 30.5 | 11.2 | 16.3 | 29.6 | not varied |
| Example 9 | 11.4 | 16.6 | 30.5 | 11.2 | 16.4 | 29.6 | not varied |
| Example 10 | 11.4 | 16.6 | 30.6 | 11.2 | 16.5 | 29.9 | not varied |
| Example 11 | 11.3 | 16.6 | 30.5 | 11.2 | 16.4 | 29.8 | not varied |

Examples 12, 13 and 14

A sol solution having a composition, a viscosity and a pH value shown in Table 12 was prepared from components: a metal compound, a catalyst, a stabilizer, an organic solvent and water shown in Table 11. The sol solution was applied to the magnet produced in Example 3 and having the Al film having the thickness of 5 μm on its surface at a pulling rate shown in Table 13 by a dip coating process and then subjected to a heat treatment shown in Table 13 to form a metal oxide film on the Al film. The thickness of the formed film ($MO_x$ film: M represents Si, Zr and Ti. $0<x\leqq 2$), the amount of carbon (C) in the film and the structure of the film are shown in Table 14.

The magnet produced by the above-described process and having the metal oxide film on its surface with the Al film interposed therebetween was subjected to a corrosion resistance acceleration test under the same conditions as in Example 3. Results are shown in Table 15. As a result, it was found that the resulting magnet satisfies a required corrosion resistance sufficiently.

Examples 15, 16 and 17

A sol solution having a composition, a viscosity and a pH value shown in Table 12 was prepared from components: a metal compound, a catalyst, a stabilizer, an organic solvent and water shown in Table 11. The sol solution was applied to the magnet produced in Example 4 and having the Al film having the thickness of 7 μm on its surface at a pulling: rate shown in Table 13 by a dip coating process and then subjected to a heat treatment shown in Table 13 to form a metal oxide film on the Al film. The thickness of the formed film ($MO_x$ film: M represents Si, Zr and Ti. $0<x\leqq 2$), the amount of carbon (C) in the film and the structure of the film are shown in Table 14.

The magnet produced by the above-described process and having the metal oxide film on its surface with the Al film interposed therebetween was subjected to a corrosion resistance acceleration test under the same conditions as in Example 3. Results are shown in Table 15. As a result, it was found that the resulting magnet satisfies a required corrosion resistance sufficiently. The magnet produced in Example 15 and having the Si oxide film on its surface with the Al film interposed therebetween was subjected to another test, i.e., a compressing-shearing test under the same conditions as in Example 2 to measure a shear bond strength of the magnet, thereby providing an excellent value of 287 kgf/$cm^2$.

Examples 18, 19 and 20

A sol solution having a composition, a viscosity and a pH value shown in Table 12 was prepared from components: a metal compound, a catalyst, a stabilizer, an organic solvent and water shown in Table 11. The sol solution was applied to the magnet produced in Example 5 and having the Al film having the thickness of 10 μm on its surface at a pulling rate shown in Table 13 by a dip coating process and then subjected to a heat treatment shown in Table 13 to form a metal oxide film on the Al film. The thickness of the formed film ($MO_x$ film: M represents Si, Zr and Ti. $0<x\leqq 2$), the amount of carbon (C) in the film and the structure of the film are shown in Table 14.

The magnet produced by the above-described process and having the metal oxide film on its surface with the Al film interposed therebetween was subjected to a corrosion resistance acceleration test under the same conditions as in Example 3. Results are shown in Table 15. As a result, it was found that the resulting magnet satisfies a required corrosion resistance sufficiently.

TABLE 11

| | Metal compound | Catalyst | Stabilizer | Organic solvent |
|---|---|---|---|---|
| Example 12 | tetramethoxy silane | nitric acid | not added | ethanol |
| Example 13 | zirconium isopropoxide | nitric acid | acetyl-acetone | ethanol |
| Example 14 | titanium isopropoxide | nitric acid | not added | ethanol |
| Example 15 | tetraethoxy silane | acetic acid | not added | ethanol + IPA |
| Example 16 | zirconium butoxide | acetic acid | ethyl acetoacetate | ethanol + IPA |

TABLE 11-continued

| | Metal compound | Catalyst | Stabilizer | Organic solvent |
|---|---|---|---|---|
| Example 17 | titanium butoxide | hydrochloric acid | acetyl-acetone | ethanol + IPA |
| Example 18 | dimethyl-diethoxy silane | hydrochloric acid | not added | ethanol |
| Example 19 | zirconium octylate | hydrochloric acid | not added | IPA |
| Example 20 | titanium isopropoxide | nitric acid | not added | ethanol |

IPA: isopropyl alcohol

TABLE 12

| | Proportion of metal compound (% by weight) | Molar ratio: Catalyst/ Metal compound | Molar ratio: Stabilizer/ Metal compound | Molar ratio: Water/ Metal compound | Viscosity (cP) | pH |
|---|---|---|---|---|---|---|
| Example 12 | 10 (Note.1) | 0.001 | 0 | 1 | 1.8 | 3.2 |
| Example 13 | 3 (Note.2) | 0.001 | 1 | 5 | 1.8 | 3.4 |
| Example 14 | 3 (Note.3) | 0.002 | 0 | 1 | 2.1 | 2.1 |
| Example 15 | 5 (Note.1) | 2 | 0 | 5 | 1.4 | 4.2 |
| Example 16 | 5 (Note.2) | 2 | 1.5 | 1 | 1.7 | 4.0 |
| Example 17 | 5 (Note.3) | 0.005 | 1.5 | 3 | 1.8 | 2.6 |
| Example 18 | 1 (Note.1) | 0.005 | 0 | 20 | 1.5 | 2.3 |
| Example 19 | 2 (Note.2) | 0.005 | 0 | 0 (Note.4) | 1.6 | 2.6 |
| Example 20 | 3 (Note.3) | 0.002 | 0 | 1 | 2.1 | 2.1 |

Note.1: in terms of $SiO_2$
Note.2: in terms of $ZrO_2$
Note.3: in terms of $TiO_2$
Note.4: utilizing water vapor in the atmosphere

TABLE 13

| | Pulling rate (cm/min) | Heat treatment | Note |
|---|---|---|---|
| Example 12 | 5 | 100° C. × 20 min | |
| Example 13 | 10 | 200° C. × 20 min | |
| Example 14 | 10 | 200° C. × 20 min | |
| Example 15 | 10 | 200° C. × 20 min | |
| Example 16 | 10 | 350° C. × 20 min | |
| Example 17 | 10 | 350° C. × 20 min | |
| Example 18 | 5 | 150° C. × 10 min | Pulling-up and heat treatment were repeated five times |
| Example 19 | 5 | 250° C. × 10 min | Pulling-up and heat treatment were repeated five times |
| Example 20 | 5 | 250° C. × 10 min | Pulling-up and heat treatment were repeated five times |

TABLE 14

| | Metal oxide film | Thickness (μm) | Amount of C in film (ppm) | Structure of film |
|---|---|---|---|---|
| Example 12 | Si oxide film | 0.3 | 350 | amorphous |
| Example 13 | Zr oxide film | 0.3 | 380 | amorphous |
| Example 14 | Ti oxide film | 0.3 | 380 | amorphous |
| Example 15 | Si oxide film | 0.08 | 80 | amorphous |
| Example 16 | Zr oxide film | 0.1 | 140 | essentially amorphous (and partially crystalline) |

TABLE 14-continued

| | Metal oxide film | Thickness (μm) | Amount of C in film (ppm) | Structure of film |
|---|---|---|---|---|
| Example 17 | Ti oxide film | 0.1 | 140 | essentially amorphous (and partially crystalline) |
| Example 18 | Si oxide film | 0.8 | 500 | amorphous |
| Example 19 | Zr oxide film | 1 | 450 | essentially amorphous (and partially crystalline) |
| Example 20 | Ti oxide film | 1 | 320 | essentially amorphous (and partially crystalline) |

TABLE 15

| | Before corrosion-resistance test | | | After corrosion-resistance test | | | |
|---|---|---|---|---|---|---|---|
| | Br (kG) | iHc (kOe) | (BH) max (MGOe) | Br (kG) | iHc (kOe) | (BH) max (MGOe) | Appearance after test |
| Example 12 | 11.4 | 16.7 | 30.6 | 11.2 | 16.3 | 29.7 | not varied |
| Example 13 | 11.4 | 16.6 | 30.6 | 11.2 | 16.4 | 29.7 | not varied |
| Example 14 | 11.3 | 16.6 | 30.4 | 11.3 | 16.5 | 29.8 | not varied |
| Example 15 | 11.3 | 16.6 | 30.4 | 11.2 | 16.5 | 29.9 | not varied |
| Example 16 | 11.3 | 16.6 | 30.4 | 11.3 | 16.6 | 30.0 | not varied |
| Example 17 | 11.4 | 16.6 | 30.5 | 11.2 | 16.5 | 29.8 | not varied |
| Example 18 | 11.4 | 16.5 | 30.5 | 11.3 | 16.3 | 29.7 | not varied |
| Example 19 | 11.4 | 16.7 | 30.6 | 11.3 | 16.5 | 29.9 | not varied |
| Example 20 | 11.4 | 16.7 | 30.6 | 11.3 | 16.4 | 29.9 | not varied |

Example 21

A sol solution having a composition, a viscosity and a pH value shown in Table 17 was prepared from components: a Si compound, an Al compound, a catalyst, a stabilizer, an organic solvent and water shown in Table 16. The sol solution was applied to the surface of the magnet produced in Example 1 and having the Al film having the thickness of 0.5 μm on its surface at a pulling rate shown in Table 18 by a dip coating process and then subjected to a heat treatment shown in Table 18 to form a Si—Al composite oxide film on the Al film. The thickness of the formed film ($SiO_x.Al_2O_y$ film: $0<x\leqq 2$ and $0<y\leqq 3$) the amount of carbon (C) in the film and the structure of the film are shown in Table 19.

The magnet produced by the above-described process and having the Si—Al composite oxide film on its surface with the Al film interposed therebetween was subjected to a corrosion resistance acceleration test under the same conditions as in Example 1. Results are shown in Table 20. As a result, it was found that the resulting magnet satisfies a required corrosion resistance sufficiently. The magnet was also subjected to another test, i.e., a compressing-shearing test under the same conditions as in Example 2 to measure a shear bond strength of the magnet, thereby providing an excellent value of 322 kgf/cm$^2$.

Example 22

A sol solution having a composition, a viscosity and a pH value shown in Table 17 was prepared from components: a Si compound, an Al compound, a catalyst, a stabilizer, an organic solvent and water shown in Table 16. The sol solution was applied to the surface of the magnet produced in Example 2 and having the Al film having the thickness of 0.9 μm on its surface at a pulling rate shown in Table 18 by a dip coating process and then subjected to a heat treatment shown in Table 18 to form a Si—Al composite oxide film on the Al film. The thickness of the formed film ($SiO_x.Al_2O_y$ film: $0<x\leqq 2$ and $0<y\leqq 3$) the amount of carbon (C) in the film and the structure of the film are shown in Table 19.

The magnet produced by the above-described process and having the Si—Al composite oxide film on its surface with the Al film interposed therebetween was subjected to a corrosion resistance acceleration test under the same conditions as in Example 1. Results are shown in Table 20. As a result, it was found that the resulting magnet satisfies a required corrosion resistance sufficiently. The magnet was also subjected to another test, i.e., a compressing-shearing test under the same conditions as in Example 2 to measure a shear bond strength of the magnet, thereby providing an excellent value of 332 kgf/cm$^2$.

Example 23

A sol solution having a composition, a viscosity and a pH value shown in Table 17 was prepared from components: a Si compound, an Al compound, a catalyst, a stabilizer, an organic solvent and water shown in Table 16. The sol solution was applied to the surface of the magnet produced in Example 3 and having the Al film having the thickness of 5 μm on its surface at a pulling rate shown in Table 18 by a dip coating process and then subjected to a heat treatment shown in Table 18 to form a Si—Al composite oxide film on the Al film. The thickness of the formed film ($SiO_x.Al_2O_y$ film: $0<x\leqq 2$ and $0<y\leqq 3$), the amount of carbon (C) in the film and the structure of the film are shown in Table 19.

The magnet produced by the above-described process and having the Si—Al composite oxide film on its surface with the Al film interposed therebetween was subjected to a corrosion resistance acceleration test under the same conditions as in Example 3. Results are shown in Table 21. As a result, it was found that the resulting magnet satisfies a required corrosion resistance sufficiently. The magnet was also subjected to another test, i.e., a compressing shearing test under the same conditions as in Example 2 to measure a shear bond strength of the magnet, thereby providing an excellent value of 322 kgf /cm$^2$.

Example 24

A sol solution having a composition, a viscosity and a pH value shown in Table 17 was prepared from components: a Si compound, an Al compound, a catalyst, a stabilizer, an organic solvent and water shown in Table 16. The sol solution was applied to the surface of the magnet produced in Example 4 and having the Al film having the thickness of 7 μm on its surface at a pulling rate shown in Table 18 by a dip coating process and then subjected to a heat treatment shown in Table 18 to form a Si—Al composite oxide film on the Al film. The thickness of the formed film ($SiO_x.Al_2O_y$ film: $0<x\leqq 2$ and $0<y\leqq 3$), the amount of carbon (C) in the film and the structure of the film are shown in Table 19.

The magnet produced by the above-described process and having the Si—Al composite oxide film on its surface with the Al film interposed therebetween was subjected to a corrosion resistance acceleration test under the same conditions as in Example 3. Results are shown in Table 21. As a result, it was found that the resulting magnet satisfies a required corrosion resistance sufficiently. The magnet was also subjected to another test, i.e., a compressing-shearing test under the same conditions as in Example 2 to measure a shear bond strength of the magnet, thereby providing an excellent value of 319 kgf/$cm^2$.

Example 25

A sol solution having a composition, a viscosity and a pH value shown in Table 17 was prepared from components: a Si compound, an Al compound, a catalyst, a stabilizer, an organic solvent and water shown in Table 16. The sol solution was applied to the surface of the magnet produced in Example 5 and having the Al film having the thickness of 10 μm on its surface at a pulling rate shown in Table 18 by a dip coating process and then subjected to a heat treatment shown in Table 18 to form a Si—Al composite oxide film on the Al film. The thickness of the formed film ($SiO_x.Al_2O_y$ film: $0<x\leqq 2$ and $0<y\leqq 3$), the amount of carbon (C) in the film and the structure of the film are shown in Table 19.

The magnet produced by the above-described process and having the Si—Al composite oxide film on its surface with the Al film interposed therebetween was subjected to a corrosion resistance acceleration test under the same conditions as in Example 3. Results are shown in Table 21. As a result, it was found that the resulting magnet satisfies a required corrosion resistance sufficiently. The magnet was also subjected to another test, i.e., a compressing-shearing test under the same conditions as in Example 2 to measure a shear bond strength of the magnet, thereby providing an excellent value of 329 kgf/$cm^2$.

TABLE 16

| | Si compound | Al compound | Catalyst | Stabilizer | Organic solvent |
|---|---|---|---|---|---|
| Example 21 | tetra-methoxy silane | aluminum iso-propoxide | nitric acid | not added | ethanol |

TABLE 16-continued

| | Si compound | Al compound | Catalyst | Stabilizer | Organic solvent |
|---|---|---|---|---|---|
| Example 22 | tetra-ethoxy silane | aluminum butoxide | acetic acid | not added | ethanol + IPA |
| Example 23 | tetra-methoxy silane | aluminum iso-propoxide | nitric acid | not added | ethanol |
| Example 24 | tetra-ethoxy silane | aluminum butoxide | acetic acid | not added | ethanol + IPA |
| Example 25 | dimethyl-diethoxy silane | Si—Al composite alkoxide (Note.1) | hydro-chloric acid | not added | ethanol |

Note.1: Compound represented by $(H_5C_2O)_3SiOAl(OC_2H_5)_2$
IPA: isopropyl alcohol IPA: isopropyl alcohol

TABLE 17

| | Proportion* of metal compounds (% by weight) | Molar ratio Al/Si + Al | Molar ratio Catalyst/Metal compounds | Molar ratio Water/Metal compound | Viscosity (cP) | pH |
|---|---|---|---|---|---|---|
| Example 21 | 10 | 0.05 | 0.001 | 1 | 1.8 | 3.1 |
| Example 22 | 5 | 0.1 | 2 | 5 | 1.5 | 4.1 |
| Example 23 | 10 | 0.05 | 0.001 | 1 | 1.8 | 3.1 |
| Example 24 | 5 | 0.1 | 2 | 5 | 1.5 | 4.1 |
| Example 25 | 1 | 0.2 | 0.005 | 10 | 1.7 | 2.6 |

*in terms of $SiO_2 + Al_2O_3$

TABLE 18

| | Pulling rate (cm/min) | Heat treatment | Note |
|---|---|---|---|
| Example 21 | 5 | 100° C. × 20 min | |
| Example 22 | 5 | 100° C. × 20 min | |
| Example 23 | 5 | 100° C. × 20 min | |
| Example 24 | 5 | 200° C. × 20 min | |
| Example 25 | 5 | 100° C. × 10 min | Pulling-up and heat treatment were repeated five times |

TABLE 19

| | Thickness (μm) | Amount of C in film (ppm) | Structure of film |
|---|---|---|---|
| Example 21 | 0.2 | 320 | amorphous |
| Example 22 | 0.07 | 210 | amorphous |
| Example 23 | 0.2 | 320 | amorphous |
| Example 24 | 0.07 | 190 | amorphous |
| Example 25 | 0.9 | 450 | amorphous |

TABLE 20

| | Before corrosion-resistance test | | | After corrosion-resistance test | | | |
|---|---|---|---|---|---|---|---|
| | Br (kG) | iHc (kOe) | (BH) max (MGOe) | Br (kG) | iHc (kOe) | (BH) max (MGOe) | Appearance after test |
| Example 21 | 11.3 | 16.5 | 30.4 | 11.3 | 16.4 | 29.8 | not varied |
| Example 22 | 11.4 | 16.6 | 30.5 | 11.3 | 16.5 | 29.9 | not varied |

TABLE 21

| | Before corrosion-resistance test | | | After corrosion-resistance test | | | |
|---|---|---|---|---|---|---|---|
| | Br (kG) | iHc (kOe) | (BH) max (MGOe) | Br (kG) | iHc (kOe) | (BH) max (MGOe) | Appearance after test |
| Example 23 | 11.4 | 16.5 | 30.5 | 11.4 | 16.4 | 29.9 | not varied |
| Example 24 | 11.3 | 16.5 | 30.4 | 11.3 | 16.4 | 29.8 | not varied |
| Example 25 | 11.4 | 16.6 | 30.6 | 11.4 | 16.3 | 29.7 | not varied |

Example 26

The magnet test piece was cleaned under the same conditions as in Example 1. Then, an ingot of metal Sn used as a coating material was heated, evaporated and the magnet test piece was subjected to a vacuum evaporation process for 30 minutes under a condition of an argon gas pressure $1 \times 10^{-2}$ Pa to form a Sn film on the surface of the magnet. The Sn film was left to cool. The resulting Sn film had a thickness of 8 The same treatment as in Example 9 was carried out using the same sol solution as in Example 9 to form a Si oxide film on the Sn film. The formed film ($SiO_2$ film: $0<x\leqq 2$) had a thickness of 0.07 $\mu$m. The amount of carbon (C) in the film was 80 ppm. The structure of the film was amorphous.

The magnet produced by the above-described process and having the Si oxide film on its surface with the Sn film interposed therebetween was subjected to a corrosion resistance acceleration test under the same conditions as in Example 3. Results are shown in Table 22. As a result, it was found that the produced magnet satisfies a required corrosion resistance sufficiently.

Example 27

The magnet test piece was cleaned under the same conditions as in Example 1. Then, an ingot of metal Zn used as a coating material was heated, evaporated and the magnet test piece was subjected to a vacuum evaporation process for 40 minutes under a condition of an argon gas pressure of $1 \times 10^{-2}$ Pa to form a Zn film on the surface of the magnet. The Zn film was left to cool. The resulting Zn film had a thickness of 10 $\mu$m.

The same treatment as in Example 9 was carried out using the same sol solution as in Example 9 to form a Si oxide film on the Zn film. The formed film ($SiO_2$ film: $0<x\leqq 2$) had a thickness of 0.08 $\mu$m. The amount of carbon (C) in the film was 80 ppm. The structure of the film was amorphous.

The magnet produced by the above-described process and having the Si oxide film on surface of the magnet with the Zn film interposed therebetween was subjected to a corrosion resistance acceleration test under the same conditions as in Example 3. Results are shown in Table 22. As a result, it was found that the produced magnet satisfies a required corrosion resistance sufficiently.

Example 28

The magnet test piece was cleaned under the same conditions as in Example 1. Then, the magnet test piece was subjected to an arc ion plating process for 3 hours with titanium metal as a target under conditions of an argon gas pressure of 0.1 Pa, a bias voltage of −80 V and a magnet temperature of 400° C., whereby a titanium film was formed on the surface of the magnet and left to cool. The formed titanium film had a thickness of 5 $\mu$m.

The same treatment as in Example 11 was carried out using the same sol solution as in Example 11 to form a Ti oxide film on the Ti film. The formed film ($TiO_2$ film $0<x\leqq 2$) had a thickness of 0.1 $\mu$m. The amount of carbon (C) in the film was 140 ppm. The structure of the film was amorphous.

The magnet produced by the above-described process and having the Ti oxide film on surface of the magnet with the Ti film interposed therebetween was subjected to a corrosion resistance acceleration test under the same conditions as in Example 3. Results are shown in Table 22. As a result, it was found that the produced magnet satisfies a required corrosion resistance sufficiently.

Example 29

The magnet test piece was cleaned under the same conditions as in Example 1. Then, an ingot of metal Al used as a coating material was heated, evaporated and the magnet test piece was subjected to a vacuum evaporation process for 50 minutes under a condition of an argon gas pressure of $1 \times 10^{-2}$ Pa to form an Al film on the surface of the magnet. The Al film was left to cool. The resulting Al film had a thickness of 8 $\mu$m.

The same treatment as in Example 9 was carried out using the same sol solution as in Example 9 to form a Si oxide film on the Al film. The formed film ($SiO_2$ film: $0<x\leqq 2$) had a thickness of 0.08 $\mu$m. The amount of carbon (C) in the film was 80 ppm. The structure of the film was amorphous.

The magnet produced by the above-described process and having the Si oxide film on surface of the magnet with the Al film interposed therebetween was subjected to a corrosion resistance acceleration test under the same conditions as in Example 3. Results are shown in Table 22. As a result, it was found that the produced magnet satisfies a required corrosion resistance sufficiently.

TABLE 22

| | Before corrosion-resistance test | | | After corrosion-resistance test | | | |
|---|---|---|---|---|---|---|---|
| | Br (kG) | iHc (kOe) | (BH) max (MGOe) | Br (kG) | iHc (kOe) | (BH) max (MGOe) | Appearance after test |
| Example 26 | 11.3 | 16.7 | 30.5 | 11.1 | 16.4 | 29.7 | not varied |
| Example 27 | 11.4 | 16.7 | 30.6 | 11.3 | 16.5 | 29.9 | not varied |
| Example 28 | 11.3 | 16.6 | 30.5 | 11.2 | 16.4 | 29.8 | not varied |
| Example 29 | 11.4 | 16.7 | 30.6 | 11.3 | 16.4 | 29.8 | not varied |

Examples 30, 31, 32 and 33

An arc ion plating process was carried out using each of metal Cu, metal Fe, metal Ni and metal Co in the same manner as in Example 1 to form a metal film on the surface of the magnet. Then, the same treatment as in Example 9 was carried out using the same sol solution as in Example 9 to form a Si oxide film on each of the metal films.

Example of Thermal Shock Resistance Test (Procedure for Experiment)

The same treatment was carried out using the same sol solution as in Example 9 for the magnet produced in Example 5 and having the Al film having the thickness of 10 μm on its surface, thereby producing a magnet having a Si oxide film having a thickness of 0.05 μm on the Al film. The application by a dip coating and the heat treatment was repeatedly carried out under the same conditions, thereby producing a magnet having each of Si oxide films of 0.3 μm, 1 μm, 5 μm and 10 μm formed on the Al film.

Each of the magnets produced by the above-described process and having the Si oxide film on its surface with the Al film interposed therebetween was subjected to a thermal shock resistance test of 1,000 cycles (85° C.×30 minutes→−40° C.×30 minutes). Thereafter, the surface of each of the magnets was observed by a scanning electronic microscope.

(Experiment Result)

The presence of cracks was not observed on the surface of each of the magnets having the thickness of the Si oxide film equal to 0.05 μm, 0.3 μm and 1 μm. On the other hand, a large number of cracks were observed on, the surface of each of the magnets having the thickness of the Si oxide film equal to 5 μm and 10 μm. As a result of a corrosion resistance acceleration test under the same conditions as:in Example 1, all the five magnets had an excellent corrosion resistance.

What is claimed is:

1. An Fe—B—R based permanent magnet wherein R is a rare earth metal, said magnet having a metal oxide film having a thickness of 0.01 μm to 1 μm provided on the surface thereof and a metal film interposed between the metal oxide film and the magnet, wherein said metal oxide film is formed of at least one metal oxide component selected from the group consisting of Al oxide, Si oxide, Zr oxide and Ti oxide, has a carbon content in the range of 50 ppm to 1,000 ppm, consists essentially of an amorphous phase, and is formed of a metal oxide component including the same metal component as the metal component of the metal film.

2. A permanent magnet according to claim 1, wherein said metal film is formed of at least one metal component selected from the group consisting of Al, Sn, Zn, Cu, Fe, Ni, Co and Ti.

3. A permanent magnet according to claim 1, wherein said metal film has a thickness in a range of 0.01 μm to 50 μm.

4. A permanent magnet according to claim 1, wherein the thickness of said metal oxide film is in a range of 0.05 μm to 0.5 μm.

* * * * *